(12) United States Patent
Wang et al.

(10) Patent No.: US 9,680,776 B2
(45) Date of Patent: Jun. 13, 2017

(54) METHOD AND APPARATUS FOR INSTANT MESSAGING BASED ON USER INTERFACE

(71) Applicant: Tencent Technology (Shenzhen) Company Limited, Shenzhen, Guangdong (CN)

(72) Inventors: Wentao Wang, Shenzhen (CN); Shundong Gao, Shenzhen (CN); Yehui Lin, Shenzhen (CN); Shourun Zeng, Shenzhen (CN); Wenxiang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 493 days.

(21) Appl. No.: 14/155,095

(22) Filed: Jan. 14, 2014

(65) Prior Publication Data

US 2014/0129960 A1 May 8, 2014

Related U.S. Application Data

(63) Continuation of application No. PCT/CN2013/074974, filed on Apr. 28, 2013.

(30) Foreign Application Priority Data

May 24, 2012 (CN) .......................... 2012 1 0163487

(51) Int. Cl.
*G06F 3/048* (2013.01)
*H04L 12/58* (2006.01)
(Continued)

(52) U.S. Cl.
CPC ............ *H04L 51/04* (2013.01); *G06F 3/0481* (2013.01); *G06F 3/04842* (2013.01); *G06F 9/4443* (2013.01)

(58) Field of Classification Search
CPC .... G06F 17/30867; G06F 3/0481; G08B 1/08
See application file for complete search history.

(56) References Cited

U.S. PATENT DOCUMENTS

2002/0130904 A1* 9/2002 Becker .................. G06F 3/0481
715/753
2004/0145608 A1* 7/2004 Fay ......................... G06Q 10/10
715/758

(Continued)

FOREIGN PATENT DOCUMENTS

CN 101068257 A 11/2007
CN 101102290 A 1/2008
(Continued)

OTHER PUBLICATIONS

Japanese First Office Action for corresponding Japanese Application and English summary.

(Continued)

*Primary Examiner* — William Bashore
*Assistant Examiner* — Rayeez Chowdhury
(74) *Attorney, Agent, or Firm* — Brinks Gilson & Lione (57) ABSTRACT

A method and apparatus for instant messaging based on a user interface is provided. The method comprises providing a window having a plurality of regions in the user interface, wherein the plurality of regions comprise at least one navigation region, and at least one message region to display one or more dialog windows; receiving a navigation input within navigation region; navigating among the one or more dialog windows based on the navigation input; and displaying the one or more dialog windows in the message region.

5 Claims, 4 Drawing Sheets

(51) Int. Cl.
*G06F 3/0481* (2013.01)
*G06F 3/0484* (2013.01)
*G06F 9/44* (2006.01)

(56) References Cited

U.S. PATENT DOCUMENTS

2005/0091314 A1* 4/2005 Blagsvedt .............. G06Q 10/10
 709/204
2007/0186173 A1* 8/2007 Both .................... G06Q 10/107
 715/753

FOREIGN PATENT DOCUMENTS

| | | |
|---|---|---|
| CN | 101110792 A | 1/2008 |
| CN | 101291281 A | 10/2008 |
| CN | 101605308 A | 12/2009 |
| JP | 2006516773 A | 7/2007 |
| JP | 2007521697 A | 8/2007 |
| JP | 2008276460 A | 11/2008 |
| JP | 2009545074 A | 12/2009 |
| JP | 2010514053 A | 4/2010 |
| WO | WO 2012/048601 A1 | 4/2012 |

OTHER PUBLICATIONS

Extended European Search Report dated Jan. 26, 2016 for corresponding European Patent Application No. 13794724.8, 9 pages.
International Search Report from PCT/CN2013/074974 dated Jul. 18, 2013.

* cited by examiner

METHOD AND APPARATUS FOR INSTANT MESSAGING BASED ON USER INTERFACE

CROSS-REFERENCE TO RELATED APPLICATIONS

This application is a continuation of PCT Application No. PCT/CN2013/074974, filed on Apr. 28, 2013, which claims priority to a Chinese patent application No. 201210163487.6, entitled "METHOD AND APPARATUS FOR INSTANT MESSAGING BASED ON USER INTERFACE" and filed on May 24, 2012, both of which are incorporated herein by reference in their entireties.

TECHNICAL FIELD

The present disclosure relates to user interface technology, and in particular to a method and apparatus for instant messaging based on a user interface.

BACKGROUND

With the development of computer technology, there are various types of computer operating systems for operating a computer, including Windows Operating System developed by Microsoft Corporation. According to the Windows Operating System, the user interface technology, for example, MetroUI style of Windows 8 Operating System from Microsoft Corporation, is proposed. A user interface established by adopting this user interface technology is a user interface provided not for an application but for information per se, with focus on the information per se. An Immersive design is adopted in the user interface, and a brand new user interface interactive experience is provided to the user with concise and fast response, minimal clicks, inherent information push and direct content interaction.

With the development of the user interface technology, there are various applications based on the user interface. However, in an instant messaging application, dialogs from different users have to be displayed by using different dialog windows in a client. Therefore, how to switch between the dialog windows by using the user interface technology so as to adapt to the requirement for the instant messaging application becomes an urgent problem to be solved.

SUMMARY

The present disclosure provides a method for instant messaging based on a user interface, and the method can implement the instant messaging based on a user interface.

The present disclosure further provides an apparatus for instant messaging based on a user interface, and the apparatus can implement the instant messaging based on a user interface.

In order to achieve the objects described above, the technical solutions according to the present disclosure are as follows.

A method for instant messaging based on a user interface includes: providing, in the user interface, a window having a plurality of regions, where the plurality of regions comprise at least one navigation region and at least one message region to display one or more dialog windows; receiving a navigation input within navigation region; navigating, by at least one processor, among the one or more dialog windows based on the navigation input and displaying the dialog windows in the message region.

An apparatus comprising a user interface, a processor and a non-transitory storage medium accessible to the processor, wherein the non-transitory storage medium is configured to store: a providing module, configured to provide, in the user interface, a window having a plurality of regions, where the plurality of regions include at least one navigation region and at least one message region to display one or more dialog windows; the navigation region navigates among dialog windows displayed in the message region and navigates among the dialog windows; and the message region displays the dialog windows; and a displaying module, configured to display the window having the plurality of regions provided in the user interface by the providing module.

An apparatus comprising a user interface, a processor and a non-transitory storage medium accessible to the processor, the non-transitory storage medium is configured to store a routing function module and a transceiver module, wherein the routing function module is configured to route a message to a corresponding dialog window of an interface layer of a client or to a provided message link, wherein the message link is configured to receive a notification of an unread message and the corresponding unread message; and the transceiver module is configured to receive the message from a protocol layer of the client and send the message to the routing function module, and to transfer the message received from the dialog window of the interface layer of the client to the protocol layer of the client.

A non-transitory computer-readable storage medium comprising a set of instructions for instant messaging based on a user interface, the set of instructions to direct at least one processor to perform acts of: providing, in the user interface, a window having a plurality of regions, wherein the plurality of regions comprise at least one navigation region, and at least one message region to display one or more dialog windows; receiving a navigation input within the navigation region; navigating, by at least one processor, among the one or more dialog windows based on the navigation input; and displaying the one or more dialog windows in the message region.

It may be seen from the technical solutions described above that, according to the present disclosure, the window having multiple regions is provided in the user interface, where the navigation region is configured to navigate among the dialog windows displayed in the message region, and the message region is configured to display the dialog windows. Therefore, according to the present disclosure, different dialog windows can be adopted to display dialogs from different users, and the dialog windows are switched from one to another under the navigation, so as to meet the requirement for the instant messaging application. In order to exchange messages and provide unread messages in the dialog windows in the user interface layer of the client, a message routing subsystem is established in the apparatus for instant messaging based on a user interface, that is, in the logic layer of the client. The message routing subsystem receives a message from the protocol layer of the client, routes, based on a destination window identifier of the received message, to a corresponding dialog window of the interface layer of the client or to a provided message link configured to receive a notification of an unread message and the corresponding unread message, and transfers the message received from the dialog window of the interface layer of the client to the protocol layer of the client for transmission. Therefore, the present disclosure implements the instant messaging based on the user interface.

BRIEF DESCRIPTION

DETAILED DESCRIPTION

To render the object, solution and advantage of the present disclosure more apparent, the various embodiments of the present disclosure are further described in details in combination with accompanying drawings and embodiments below. Like numbered elements in the same or different drawings perform equivalent functions. It should be understood that the specific embodiments described here are used only to explain the present disclosure, and are not intended to limit the present disclosure.

When describing a particular example, the example may include a particular feature, structure, or characteristic, but every example may not necessarily include the particular feature, structure or characteristic. This should not be taken as a suggestion or implication that the features, structure or characteristics of two or more examples, or aspects of the examples, should not or could not be combined, except when such a combination is explicitly excluded.

A user interface in the style of, for example, MetroUI under Windows 8 Operating System from Microsoft Corporation has the advantage of including multiple windows which are designed in an immersive mode and automatically pushing information to the windows for displaying. In the immersive design for the multiple windows, one window is displayed when being clicked by a user and other windows are not displayed. Moreover, each of the other windows has a region that can be clicked; once the user clicks, a corresponding one among the other windows is opened and the currently opened window is closed at the same time.

In an example embodiment of the present disclosure, a user interface may be configured in the MetroUI style of Windows 8 Operating System. Metro is a symbol representing a style of operating system and a complete set of solutions supporting the style. MetroUI refers to the part of interface presentation in the set, i.e., MetroUI refers to a window having multiple regions.

In order to implement the instant messaging based on a user interface, according to an embodiment of the present disclosure, a window having multiple regions is provided in the user interface, where a navigation region is configured to navigate among dialog windows displayed in a message region and to switch the dialog windows from one to another; and the message region is configured to display the dialog windows. The window having the multiple regions provided in the user interface further includes an extension region configured to display dialog information.

In order to exchange messages and provide unread messages in dialog windows in a user interface layer of a client according to the present disclosure, a message routing subsystem may further be established in an apparatus for instant messaging based on a user interface, that is, in the logic layer of the client. The message routing subsystem includes a routing center, a routing event initiating module, message processing modules corresponding to message links and the dialog windows. When a message is received, the routing event initiating module initiates the routing center and the message processing module corresponding to the received message, the routing center calls the message processing module, the message processing module loads the message to the corresponding message link or the dialog window in the user interface layer of the client, and a notification of an unread message and the unread message are provided by the message link.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client can be stationary or mobile.

Figure 1:
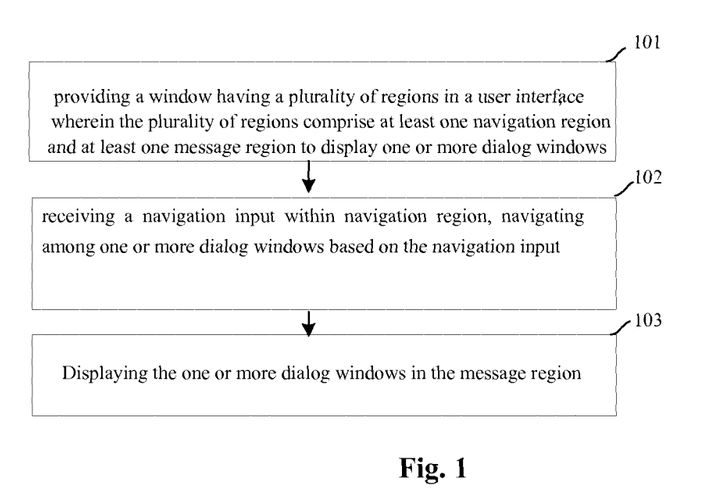
FIG. 1 is a flow chart of a method for instant messaging based on a user interface according to an embodiment of the present disclosure.

FIG. 1 is a flow chart of a method for instant messaging based on a user interface according to an embodiment of the present disclosure, and detailed steps are shown as follows.

Step 101: providing a window having multiple regions in a user interface, where the multiple regions include at least a navigation region and a message region.

Step 102: navigating among dialog windows displayed in the message region and navigating among the dialog windows, by the navigation region.

In the step, the navigating among the dialog windows is performed by controlling a multi-window switching control. The controlled multi-window switching control may be a tab control.

Step 103: configuring the message region to display the dialog windows.

In the Step 102 of the method, the multi-window switching control, such as the tab control, is a commonly used interface control in the Windows Operating System. Multiple sub-windows, in which notifications of multiple unread messages to be displayed are loaded, are combined as one window by using the control. Different sub-windows have different activation tabs. Every time an activation tab is activated, a corresponding sub-window is displayed, the notification of the loaded unread message is displayed in the sub-window, and correspondingly the loaded unread message is displayed in the dialog window.

The notification of the unread message in the sub-window is obtained from a message link in a logic layer of a client;

and the unread message displayed in the dialog window is obtained from the message link in the logic layer of the client.

In the method, the sub-window and the dialog window are both identified with a unique window identifier. The sub-window and the dialog window may be uniquely determined according to the window identifier. When a user navigates among the displayed dialog windows by using the navigation region, the window identifiers of the dialog windows accessed by the user is stored as a stack. Last-In-First-Out data management is used in the stack. Therefore, when the user wants to return to a previously displayed dialog window from a currently displayed dialog window, the stored previous window identifier is obtained by following the rule the stack, and the dialog window corresponding to the previous window identifier is returned to. Certainly, a pointer, a chain and so on rather than the stack may also be used to implement the function.

In the method, the regions provided in the window having the multiple regions may further include an extension region for displaying dialog information.

Figure 2:
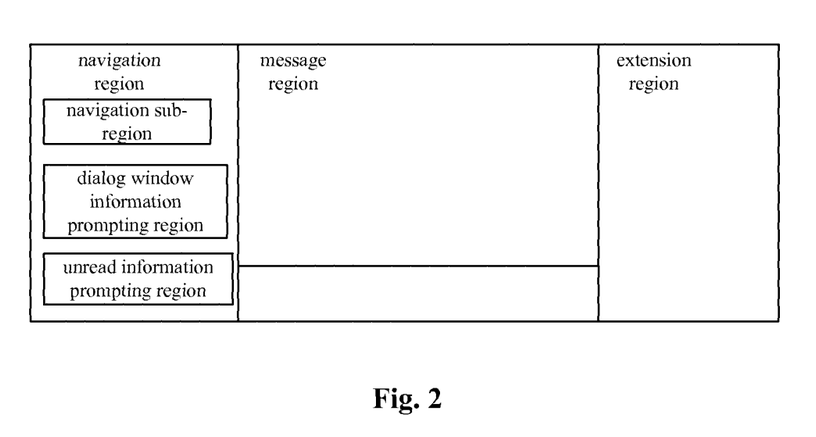
FIG. 2 is a schematic diagram showing the user interface-based window having multiple regions provided on a user interface according to an embodiment of the present disclosure.

FIG. 2 is a structural schematic diagram showing the user interface-based window having multiple regions provided on a user interface according to an embodiment of the present disclosure. As shown in FIG. 2, the window includes a left region, a middle region and a right region. The left region is a navigation region, the middle region is a message region, and the right region is an extension region.

The navigation may also be divided into three function sub-regions.

The function sub-region at the upper portion is a navigation sub-region used to navigate among dialog windows displayed in the message region. Specifically, because an immersive mode is used in the user interface, multiple pieces of dialog window navigation information corresponding to window identifiers may be provided concurrently in the navigation sub-region, and the multiple pieces of dialog window navigation information are provided as a stack in an order of user access. This is because the dialog windows stayed in the message region by the user are different at different times; the user generally selects a dialog window to be stayed currently, that is, an immerged dialog window, via a friend list in a upper level interface or via the dialog information in the extension region; and when the immerged dialog window is exited, the previous dialog window should be returned to. Therefore, it is needed to provide the dialog window navigation information corresponding to the window identifiers as a stack in the order of Last-In-First-Out. The previous dialog window may be returned to according to an order of the dialog window navigation information.

The function sub-region in the middle portion is a dialog window information prompting region, including the topic, the icon and the like of the dialog windows, used for providing prompt for the user.

The function sub-region in the lower portion is an unread message prompting region, used to provide a notification of an unread message and to provide a message link of the unread message. When the user is immerged in a dialog window and there is another dialog needed to communicate with the user, it is needed to effectively prompt a sent message for the user. Therefore, the unread message prompting region is provided. The source and number of the unread messages are prompted to the user by using icons and digits. The prompt is performed by controlling a multi-window switching control, i.e., a tab control, so that the multiple sub-windows providing the unread messages are switched from one to another at the selection of the user and therefore the interactive experience for the messaging is improved.

The middle region is the message region, namely, a dialog window region for displaying the dialog window in which the user is immerged. The middle region is similar as an existing chatting window for the instant messaging, and may include an upper sub-portion and a lower sub-portion. The upper sub-portion is a message displaying sub-region that may display rich text messages and display voice messages. The lower sub-portion is a message editing sub-region that may include a sub-region for editing texts, an interface for inserting "expression(s)" and icon(s), a voice recording region and so on.

The right region is the extension region that is used to display dialog information. The dialog information includes aggregation information of friends, chat history of the friends, information of the friends and so on.

Figure 3:
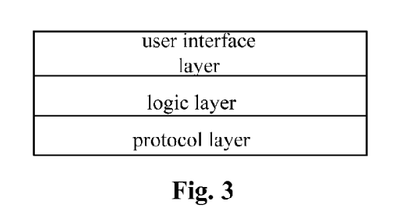
FIG. 3 is a schematic diagram showing the hierarchy of an apparatus for instant messaging based on a user interface according to an embodiment of the present disclosure.

There are three layers in the apparatus for instant messaging based on a user interface. As shown in FIG. 3, FIG. 3 is a schematic diagram of the hierarchy of the apparatus for instant messaging based on a user interface according to an embodiment of the present disclosure. The hierarchy includes a protocol layer, a logic layer, and a user interface layer from bottom to top.

The protocol layer is configured to communicate with an instant messaging server on a network side, to receive a message and transfer the message to the logic layer, and to receive a message from the logic layer and transfer the message to the instant messaging server.

A server, as used herein, may refer to one or more server computers configured to provide certain server functionalities, such as database management and search engines. A server may also include one or more processors to execute computer programs in parallel.

The user interface layer shows the message received from the logic layer to a user by using a dialog window or a sub-window, and receives a message from the dialog window and transfers the message to the logic layer. For the implementation, the user interface layer is developed by using Metro, and is easy to be implemented.

The logic layer is provided with a message routing function, and routes, according to a destination window identifier of a message received from the protocol layer, the message to a corresponding dialog window of the user interface layer or to an unread message prompting region; and the logic layer transfers the message received from the user interface layer to the protocol layer.

Specifically, a message routing subsystem is established in the logic layer. The message routing subsystem includes a routing center, a routing event initiating module, and a message processing module, where the message processing module corresponds to a message link and a dialog window. The routing event initiating module initiates the routing center and the message processing module upon receiving a message. The routing center calls the message processing module corresponding to the received message. The message processing module loads the message to the corresponding message link or the dialog window. It is notified by the message link that there is an unread message, and the unread message may be obtained by controlling a multi-window switching control.

Figure 4:
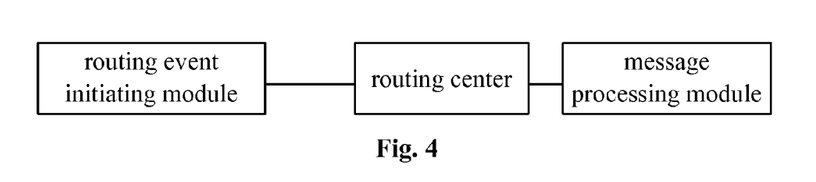
FIG. 4 is a schematic diagram showing the structure of a message routing subsystem established in the apparatus for instant messaging based on a user interface according to an embodiment of the present disclosure.

As shown in FIG. 4, FIG. 4 is a structural schematic diagram of a message routing subsystem established in the apparatus for instant messaging based on a user interface according to an embodiment of the present disclosure. The message routing subsystem includes a routing center, a routing event initiating module, a message processing module corresponding to a window identifier.

The routing event initiating module is configured to initiate the routing center and the message processing module upon receiving a message.

The routing center is configured to call the message processing module corresponding to a destination window identifier of the received message.

The message processing module is configured to load the message to a corresponding unread message prompting region or to a corresponding dialog window under the call of the routing center.

In the system, a message routing function involves message transferring and message processing. If a certain message processing module needs to receive a message and processes the message, the message routing function may be used. When the message routing function is used, firstly the message processing module should be registered on the routing center and be sorted so that the message processing module is called by the routing center when a message is received. The dialog window and the unread message prompting region corresponding to the message processing module may be identified by using the window identifier.

Figure 5:
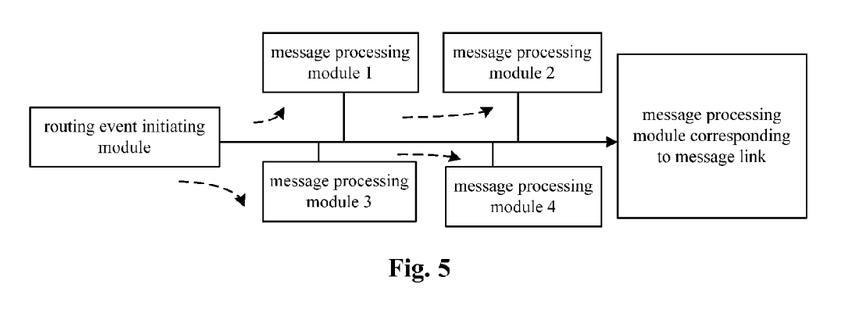
FIG. 5 is a schematic diagram showing the invocation of the message routing according to an embodiment of the present disclosure.

As shown in FIG. 5, FIG. 5 is a schematic diagram showing the invocation of the message routing according to an embodiment of the present disclosure. In FIG. 5, a message is routed by a routing event initiating module, to a message processing module called by a routing center, then the message is displayed in a corresponding dialog window or an unread message prompting region.

Figure 6:
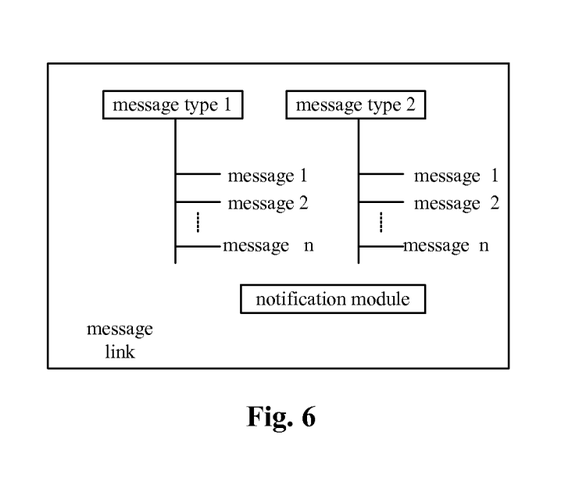
FIG. 6 is a structural schematic diagram of a message link according to an embodiment of the present disclosure.

When a window identified by a destination window identifier of the message corresponds to the unread message prompting region, a message processing module corresponding to the unread message prompting region is also registered to the routing center, and maintenance is performed via a message link. Specifically, as shown in FIG. 6, which is a structural schematic diagram of the message link according to an embodiment of the present disclosure, the message processing module corresponding to the unread message prompting region is registered on the routing center and a message link is provided. The calling of the message link by the routing center is of the lowest priority. That is, when a message is received, the routing center calls the message processing modules in turn, and if there is no message processing module corresponding to the message, the routing center calls the message link. The message link marks the message as an unread message, and stores the message according to a message type and a destination window identifier of the message. When the user needs to read the unread message, an activation tab of the unread message in the message link is clicked, a sub-window loading the notification of the unread message is activated, and a corresponding dialog window loading the unread message displays the unread message to the user. In addition, in a case where the user is immerged in the dialog window, when it is known that there is an unread message and the user interface layer is updated, the message link is further provided with a notification module, and the notification module prompts the user in the unread message prompting region. The user selects the unread message by controlling a multi-window switching control in the user interface layer, and the selected unread message is extracted and loaded to the sub-window so as to be displayed to the user.

In the FIG. 6, a message type 1 and a message type 2 are included in the message link. A message 1, a message 2, . . . , a message n are stored for each of the message type 1 and the message type 2, where n is a natural number. The message link further includes a notification module.

Figure 7:
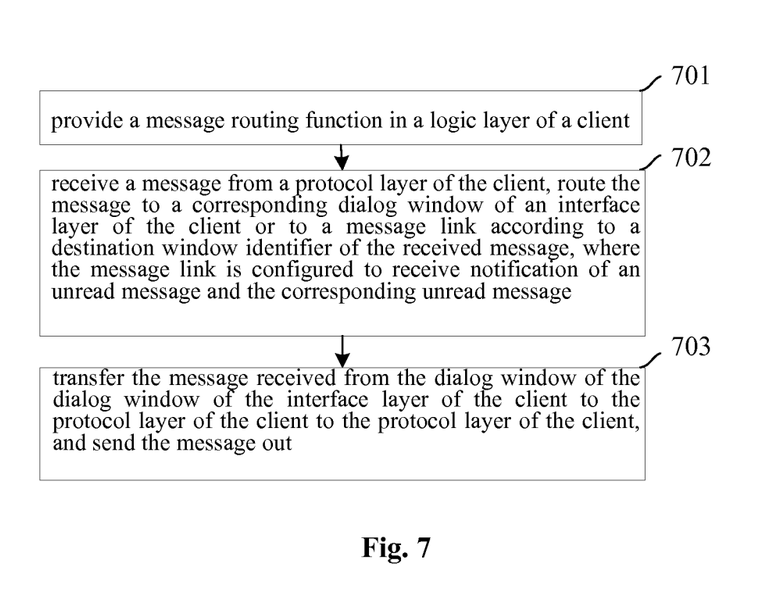
FIG. 7 is a flow chart of a method for transferring a message in a logic layer according to an embodiment of the present disclosure.

FIG. 7 is a flow chart of a method for transferring a message in a logic layer according to an embodiment of the present disclosure, and the detailed steps are shown as follows.

Step 701: providing a message routing function in a logic layer of a client;

Step 702: receiving a message from a protocol layer of the client, and routing, based on a destination window identifier of the received message, the message to a corresponding dialog window of an interface layer of the client or to a provided message link, where the message link is configured to receive a notification of an unread message and the corresponding unread message; and Step 703: transferring the message received from the dialog window of the interface layer of the client to the protocol layer of the client, and sending the message out.

Figure 8:
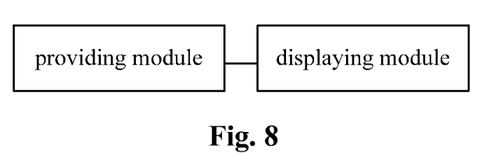
FIG. 8 is a schematic structure diagram of an apparatus for instant messaging based on a user interface according to an embodiment of the present disclosure.

FIG. 8 is a schematic structure diagram of an apparatus for instant messaging based on a user interface according to an embodiment of the present disclosure. The apparatus includes a providing module and a displaying module.

The providing module is configured to, in the user interface, a window having a plurality of regions, where the multiple regions include at least a navigation region and a message region the navigation region navigates among dialog windows displayed in the message region and navigates to switch among the dialog windows, the message region displays the dialog windows.

The displaying module is configured to display the window having the multiple regions provided in the user interface by the providing module.

In the apparatus, the providing module is further configured to provide dialog windows for displaying unread messages; the navigation region includes a plurality of sub-windows for notification of the unread messages, and different sub-windows correspond to different activation tabs; and the providing module further includes a multi-window switching control interacting module configured to navigate, via a multi-window switching control, among the dialog windows: once an activation tab is activated, a dialog window for a corresponding sub-window is displayed in the message region, and the dialog window displays the unread message.

Figure 9:
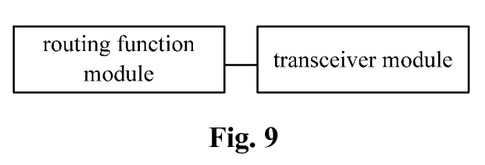
FIG. 9 is a schematic structure diagram of an apparatus for instant messaging based on a user interface according to another embodiment of the present disclosure.

FIG. 9 is a schematic structure diagram of an apparatus for instant messaging based on a user interface according to an embodiment of the present disclosure. The apparatus includes a routing function module and a transceiver module.

The routing function module is configured to route a message to a corresponding dialog window of an interface layer of a client or to a message link, where the message link is configured to receive a notification of an unread message and the corresponding unread message.

The transceiver module is configured to receive the message from a protocol layer of the client and send the message to the routing function module, and to transfer the message received from the dialog window of the interface layer of the client to the protocol layer of the client.

In the apparatus, the routing function module includes a routing center, a routing event initiating module, and a message processing module corresponding to a window identifier, where, the routing event initiating module is configured to initiate the routing center and the message processing module upon receiving the message;

the routing center is configured to call the message processing module corresponding to a destination window identifier of the received message; and the message processing module is configured to load the message to a corresponding message link or to a corresponding dialog window under the call of the routing center.

In the apparatus, the message processing module further includes a notification module configured to notify about the unread message, in a case where the message is loaded to the message link.

An embodiment of the present disclosure further provides a device for instant messaging based on a user interface. The device for instant messaging based on a user interface includes a storage configured to store instructions, and a processor coupled with the storage. The processor is configured to execute the instructions stored in the storage and to execute the foregoing methods for instant messaging based on the user interface according to the respective embodiments of the disclosure. In addition, an embodiment of the present disclosure further provides a computer-readable storage medium that stores one or more programs, wherein the one or more programs are executed by one or more processors to implement the foregoing methods for instant messaging based on the user interface according to the respective embodiments of the disclosure.

The message routing subsystem described in the embodiments of the present disclosure may be implemented by hardware, software, firmware or any combination thereof. If the message routing subsystem is implemented by software, these functions may be stored in a computer-readable storage medium, or may be transmitted to the computer-readable storage medium in a form of one or more instructions or codes. The computer-readable storage medium includes a computer storage medium and a communication medium facilitates the transition of a computer program from one place to another place. The storage medium may be an available medium that can be accessed by any general or dedicated computer. For example, such computer-readable media may include but not limited to Random Access Memory (RAM), Read Only Memory (ROM), Electrically-erasable programmable read-only memory (EEPROM), CD-ROM, or other optical disc storage apparatus, magnetic disc storage apparatus or other magnetic storage apparatus, or any other medium that can be used to load or store program codes in a form of instructions, data structures or other forms that can be read by the general or dedicated computer or a general or dedicated processor. In addition, any link may be defined properly as the computer-readable medium. The disk or disc includes a compact magnetic disc, a laser disc, an optical disc, a DVD, a floppy disk and a blue-ray disc. The disk generally copies the data in magnetism manner, and the disk generally copies the data in optic manner by using the laser. Combination of those described above may also be included in the computer-readable medium.

Optical embodiments of the present disclosure are described above and these embodiments are not intended to limit the scope of protection of the present disclosure. Any changes, equivalents, improvements made within the spirit and principle of the present disclosure fall into the scope of protection of the present disclosure. Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The invention claimed is:

1. A method for instant messaging based on a user interface, comprising:
   providing, in the user interface, a window having a plurality of regions, wherein the plurality of regions comprise at least one navigation region, and at least one message region to display one or more dialog windows;
   receiving a navigation input within navigation region;
   navigating, by at least one processor, among the one or more dialog windows based on the navigation input, wherein the navigating among the one or more dialog windows based on the navigation input comprises: concurrently providing a plurality of pieces of dialog window navigation information corresponding to one or more window identifiers, wherein the plurality of pieces of dialog window navigation information are managed in the Last-In-First-Out way based on an order of user access to return to a previous dialog window when a current dialog window is exited; and
   displaying the one or more dialog windows in the message region,
   wherein the one or more dialog windows display one or more unread messages, and the navigation region comprises one or more sub-windows for notification of the one or more unread messages, each of the one or more sub-windows corresponding to a different activation tab and a different dialog window, and the navigating among the one or more dialog windows based on the navigation input further comprises:
   activating the activation tab;
   displaying the dialog window corresponding to the sub-window which corresponds to the activated activation tab; and
   displaying the unread messages in the dialog window,
   wherein the notification of the one or more unread messages in the sub-window is obtained from a message link in a logic layer of a client; and the one or more unread messages displayed in the one or more dialog window are obtained from the message link in the logic layer of the client.

2. The method according to claim 1, wherein the plurality of regions further comprise an extension region for displaying dialog information.

3. An apparatus comprising a user interface, a processor and a non-transitory storage medium accessible to the processor, wherein the non-transitory storage medium is configured to store:
   a providing module, configured to provide, in the user interface, a window having a plurality of regions, wherein the plurality of regions comprise at least one navigation region and at least one message region to display one or more dialog windows, the navigation region navigates among the one or more dialog windows, and the message region displays the dialog windows, wherein the navigation region navigating among dialog windows comprises: concurrently providing a plurality of pieces of dialog window navigation information corresponding to window identifiers, wherein the plurality of pieces of dialog window navigation information are managed in the Last-In-First- Out way based on an order of user access to return to a previous dialog window when a current dialog window is exited; and a displaying module, configured to display the window having the plurality of regions provided in the user interface by the providing module, wherein the providing module is further configured to provide dialog windows for displaying one or more unread messages; the navigation region comprises a plurality of sub-windows for notification of the one or more unread messages, and each of the plurality of sub-windows corresponds to a different activation tab and a different dialog window; and the providing module further comprises a multi-window switching control interacting module configured to navigate, via a multi-window switching control, among the dialog windows, where the navigating among the dialog windows comprises: activating the activation tab; displaying the dialog window corresponding to the sub-window which corresponds to the activated activation tab; and displaying the unread messages in the dialog window, wherein the notification of the one or more unread messages in the sub-window is obtained from a message link in a logic layer of a client; and the one or more unread messages displayed in the one or more dialog window are obtained from the message link in the logic layer of the client.

4. A non-transitory computer-readable storage medium comprising a set of instructions for instant messaging based on a user interface, the set of instructions to direct at least one processor to perform acts of:

providing, in the user interface, a window having a plurality of regions, wherein the plurality of regions comprise at least one navigation region, and at least one message region to display one or more dialog windows;

receiving a navigation input within the navigation region;

navigating, by at least one processor, among the one or more dialog windows based on the navigation input, wherein the navigating among the one or more dialog windows based on the navigation input comprises: concurrently providing a plurality of pieces of dialog window navigation information corresponding to one or more window identifiers, wherein the plurality of pieces of dialog window navigation information are managed in the Last-In-First-Out way based on an order of user access to return to a previous dialog window when a current dialog window is exited; and displaying the one or more dialog windows in the message region, wherein the one or more dialog windows display one or more unread messages, and the navigation region comprises one or more sub-windows for notification of the one or more unread messages, each of the one or more sub-windows corresponding to a different activation tab and a different dialog window, and the navigating among the one or more dialog windows based on the navigation input further comprises:

activating the activation tab;

displaying the dialog window corresponding to the sub-window which corresponds to the activated activation tab; and displaying the unread messages in the dialog window, wherein the notification of the one or more unread messages in the sub-window is obtained from a message link in a logic layer of a client; and the one or more unread messages displayed in the one or more dialog window are obtained from the message link in the logic layer of the client.

5. The non-transitory computer-readable storage medium according to claim 4, wherein the plurality of regions further comprise an extension region for displaying dialog information.

* * * * *